V. A. FYNN.
ALTERNATING CURRENT MOTOR.
APPLICATION FILED MAR. 6, 1909.

957,668.

Patented May 10, 1910.
3 SHEETS—SHEET 1.

WITNESSES:
L. L. Mead.
W. H. Alexander.

INVENTOR
Valère A. Fynn
BY
Fowler & Huffman
ATTORNEYS

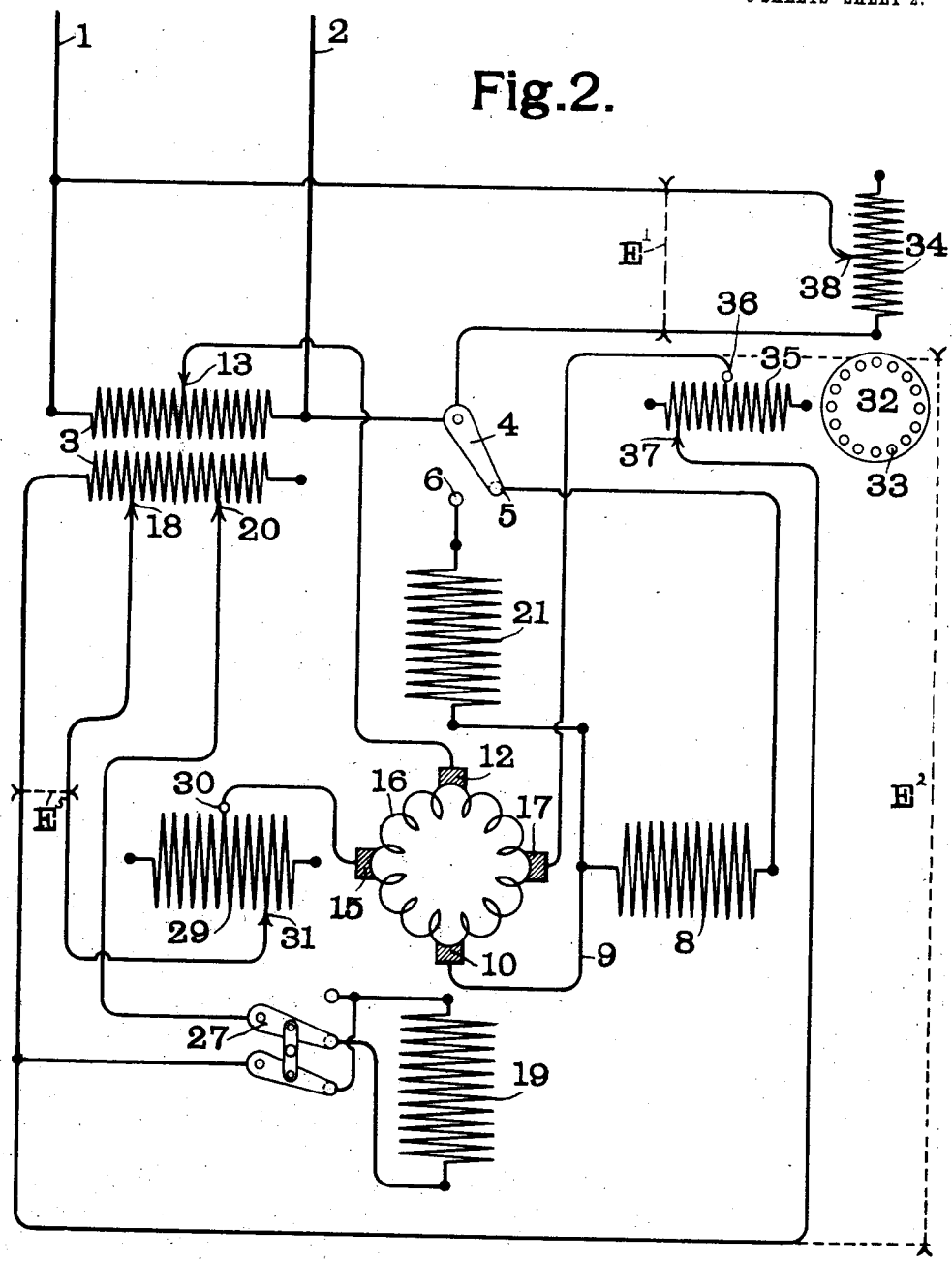

V. A. FYNN.
ALTERNATING CURRENT MOTOR.
APPLICATION FILED MAR. 6, 1909.

957,668.

Patented May 10, 1910.
3 SHEETS—SHEET 3.

Witnesses
L. L. Mead.
W. A. Alexander.

Inventor
Valère A. Fynn
By his Attorneys
Fowler & Huffman

UNITED STATES PATENT OFFICE.

VALÈRE ALFRED FYNN, OF LONDON, ENGLAND.

ALTERNATING-CURRENT MOTOR.

957,668.  Specification of Letters Patent.  Patented May 10, 1910.

Original application filed December 19, 1906, Serial No. 348,659. Divided and this application filed March 6, 1909. Serial No. 481,766.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

This application which is a division of application No. 348,659, filed December 19, 1906, relates generally to a novel form of alternating current motor and more particularly to a single phase motor of the conduction type having a shunt characteristic, its object being to provide a motor of this type which can be efficiently operated from a single phase supply and whose speed may be varied within wide limits independently of the periodicity of the supply or the number of poles of the motor.

Other objects of my invention are to provide means for starting these novel motors, means for controlling their power factor and means for improving their commutation.

The difficulty of constructing a single phase alternate current conduction motor with a shunt characteristic is well known. It chiefly consists in the fact that the phase of the exciting E. M. F. required must be approximately in phase quadrature with that of the E. M. F. impressed on the working circuit of the motor. This necessitates the use of phase splitting devices, which are all inefficient, or it requires a polyphase supply. But even if such a motor is operated from a polyphase supply the results are unsatisfactory for the commutation is bad and the speed cannot be kept at all constant with varying loads. I have overcome the main difficulty by providing a self-exciting conduction motor with a shunt characteristic, *i. e.*, one which generates its own exciting E. M. F. of the required phase and I have improved the commutation and the speed regulation by providing in my new motor two alternating fields displaced in phase and space thus creating a revolving field in the machine.

Figure 1:
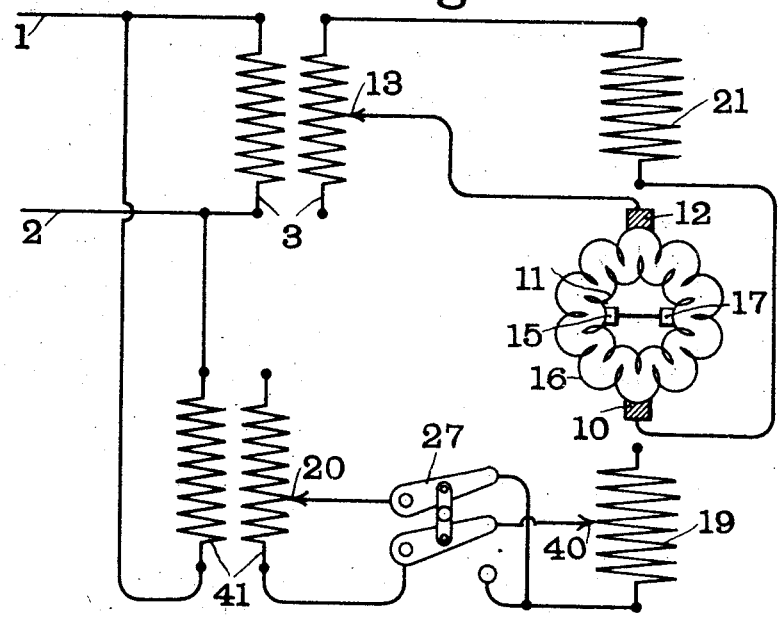
Figure 4:
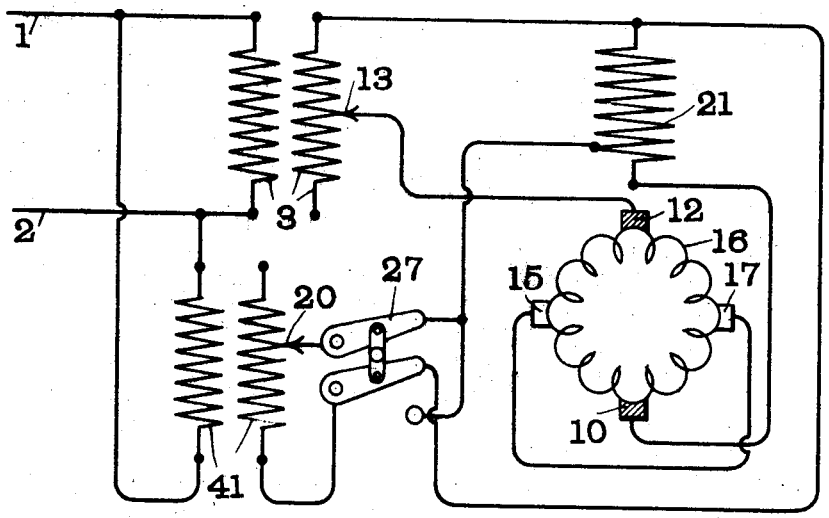
Figure 3:
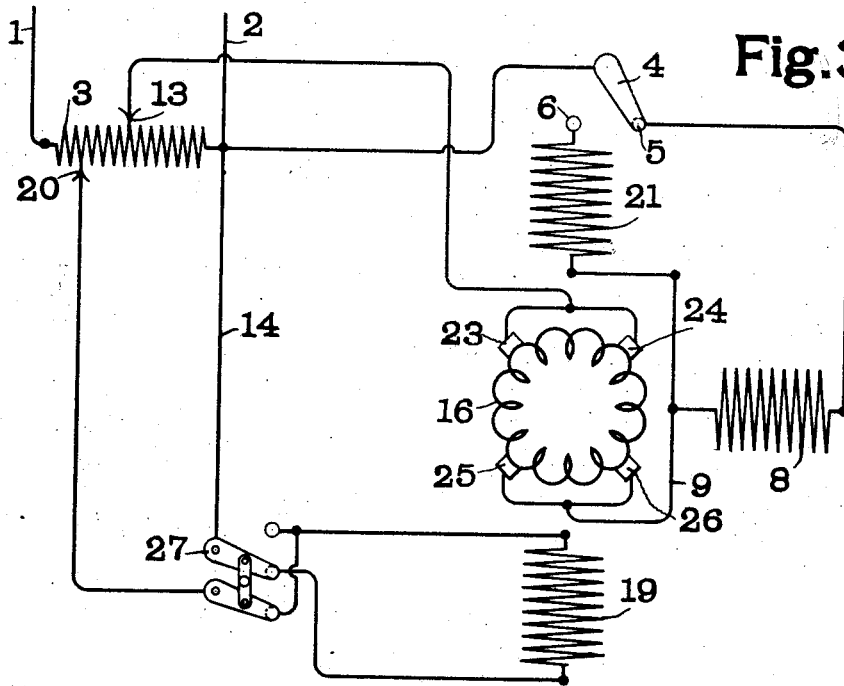

In the accompanying drawings, which illustrate a motor made in accordance with my invention and some of the possible modifications thereof, Figure 1 is a diagrammatic view of a motor embodying my invention in which the rotor is provided with two independent commuted windings; Fig. 2 is a view of the preferred form of my motor; Fig. 3 is a view showing a modification in the arrangement of the brushes; and Fig. 4 shows a modification in which the neutralizing winding is also made use of as a teaser winding.

I will now describe my invention broadly in connection with the drawings.

A motor made in accordance with this invention mainly comprises a rotor carrying any known form of commuted winding, such as 16, connected to a commutator in the usual way, brushes disposed on said commutator, a neutralizing winding 21 disposed on the stator and a teaser or transformer winding 19 also disposed on the stator. The energy is conveyed to the rotor working circuit 16 conductively by way of the working brushes 10, 12. The neutralizing winding is connected in series relation with the rotor working circuit and is so disposed as to neutralize the working ampere turns of the rotor, *i. e.* so as to reduce the self-induction of the rotor working circuit. The teaser winding 19 is preferably disposed coaxially with the neutralizing winding 21 and connected to the mains. This teaser or transformer winding produces an alternating flux along the working axis of the motor but does not react on the working circuit because the E. M. F's. it induces in the working and in the neutralizing winding conductors are practically equal in magnitude but opposite in direction. By rotation of the rotor conductors in this teaser flux an E. M. F. is generated in these conductors, its maximum appearing along an axis which is displaced by $180/n$ degrees with respect to the axis of the teaser flux. The letter "$n$" stands throughout for the number of poles of the machine. I make use of this E. M. F., which is generated in any commuted winding disposed on the rotor, for producing the motor field of this machine. For this purpose I provide an exciting circuit by closing a commuted winding, 11 in Fig. 1, by way of exciting brushes 15, 17, along an axis displaced from the axis of the neutralizing winding and at an angle to the axis of the teaser flux. The current flowing in said closed circuit is the motor field exciting current. Since the teaser flux is due to an E. M. F. of approximately the same phase as that of the working E. M. F. conductively impressed on the rotor working circuit, then the phase of the teaser flux will differ by about 90 degrees from the phase of the working E. M. F. The E. M. F. generated at the exciting brushes by rotation of the rotor conductors in the teaser flux will be of same phase although not necessarily of same direction as the teaser flux; the phase of this exciting E. M. F. will consequently differ by about 90 degrees from that of the working E. M. F. The current due to the exciting E. M. F., together with the flux due to the exciting current, will lag by about 90 degrees behind the exciting E. M. F. and will consequently be practically in phase with the working E. M. F. and also with the working current since these two differ but little in phase. It is therefore seen that the exciting E. M. F. I obtain in my new motor is of the phase required for the production of a useful motor field. In order to start this machine I provide means for temporarily converting it into a series induction motor. In order to compensate this motor I conductively introduce into the exciting circuit an E. M. F. of about the same phase as that of the supply and thereby alter the phase of the motor field and consequently that of the back E. M. F., thus varying the phase relation between the working current and the working E. M. F. to any desired extent. Some of the ways in which I vary the speed of this machine are by varying the E. M. F. impressed on the rotor along the working axis; by varying the magnitude of the transformer or teaser flux; by including in the exciting circuit a regulating E. M. F. approximately in phase quadrature with the working E. M. F. and varying the magnitude or direction of this regulating E. M. F. which can be derived from a phase converter; by including in the exciting circuit a field winding disposed on the stator and varying the number of turns of that winding and the direction of the magnetization produced by it relatively to the direction of the magnetization produced by the rotor field winding. Other ways of achieving this object will be apparent to those skilled in the art.

Referring to the specific embodiment of my invention shown in Fig. 1, the rotor carries two independent commuted windings 16 and 11; the first is made use of as a working winding, being included in the working circuit together with the neutralizing winding 21 connected in series relation and in opposition to 16 by way of the brushes 10, 12. The working circuit is fed from transformer 3 and the magnitude of the E. M. F. impressed on that circuit can be regulated at 13. The rotor winding 11 does duty as exciting winding and is short-circuited by way of the exciting brushes 15, 17 displaced with respect to the working brushes. The teaser winding 19 is coaxially disposed with respect to 21 and is fed from the shunt transformer 41. The E. M. F. impressed on 19 can be reversed at 27 and regulated at 20. The number of turns of 19 can be regulated by contact 40.

In Fig. 2 which shows the preferred form of my invention, the brush arrangement is the same as in Fig. 1 but only one commuted winding 16 is made use of on the rotor and does duty both as working and as exciting winding. The transformer 3 interposed between the line and the motor is here a two-coil transformer. A field regulating winding 29 is provided on the stator and brush 15 is connected to an intermediate point 30 of 29 in such a manner that the number of turns in 29 and the direction of the magnetization produced by them can be varied at 31. Furthermore, an E. M. F. in quadrature with the working E. M. F. is included in the exciting circuit for the purpose of regulating the magnitude of the resultant exciting E. M. F. This E. M. F. is by way of example derived from a phase converter 32, it being assumed that a single phase supply only is available. For the sake of simplicity this converter is shown as being of the squirrel-cage (33) induction type. Any other type of phase converter can, of course, be used. In this case the primary winding 34 of the converter 32 is connected across the line and means for varying the volts per turn in 34 are indicated at 38. An intermediate point 36 of the secondary 35 of the phase converter is connected to the exciting brush 17 while the movable contact 37, by means of which the magnitude and the direction of the regulating E. M. F. supplied by 35 can be controlled, is connected to the other exciting brush by way of the regulating contact 18 which controls the magnitude of the compensating E. M. F. derived from the secondary of 3, and by way of 31, 29 and 30. 31 controls the total number of effective field turns in the motor. The teaser winding 19 is connected in parallel to the mains by way of the secondary of transformer 3. The magnitude of the E. M. F. impressed on 19 can be regulated at 20 and its direction can be reversed at 27. The working circuit is fed from the primary of 3 and it comprises the neutralizing winding 21 and the rotor winding 16 connected in series relation by way of the brushes 10, 12. The magnitude of the E. M. F. impressed on the working circuit can be regulated at 13. In order to close the working circuit it is necessary to place switch 4 on point 6. When switch 4 stands on 5 then the starting winding 8 is in circuit instead of 21. The main 2 is therefore connected through switch 4 to point 5 through the starting winding 8 and conductor 9 to the working brush 10, through the commuted winding 16 to the working brush 12 and back to transformer 3 or main 1 by way of the moving contact 13. The exciting brushes 15, 17 may be short-circuited at starting by suitably placing the moving contacts 31, 18, and 37 with reference to the winding which they control. The switch 20 may be opened at starting thus disconnecting the teaser winding 19 from the mains. The starting position of switch 4 disconnects the neutralizing winding 21 at starting. The machine now starts as a series induction motor, 8 induces in 11 a current which closes over the brushes 15, 17 and does duty as working current. The current flowing through 8 is also taken through 16 by way of the brushes 10, 12 and the commuted winding 16 therefore does duty as field winding producing the motor field which in conjunction with the working current flowing along the axis 15, 17 is responsible for the starting torque. If an E. M. F. is impressed on the brushes 15, 17 from the secondary of 3 by suitably displacing 18 from its zero position, then this E. M. F. will either oppose or help the E. M. F. induced in 16 by 8 thus decreasing or increasing the current taken by the motor and the torque developed by it. The magnitude of the torque can also be controlled by moving 13 so as to vary the magnitude of the E. M. F. impressed on 8 and 16 at starting. Switch 20 need not be opened at starting for the flux due to 19 can also yield a torque in conjunction with the working current through 16 closing by way of 15 and 17 provided 27 is closed in the right direction. After the motor has reached a sufficient speed, being started in the manner set forth, its speed can be regulated by varying the working E. M. F. at 13; by varying the total number of effective field turns at 31; by varying the resultant exciting E. M. F. at 37; and by varying the magnitude of the teaser or transformer flux at 20. The power factor of the motor can be controlled by varying the magnitude of the compensating E. M. F. at 18.

In Fig. 3 the rotor only carries one commuted winding 16 and the arrangement of the brushes differs somewhat from that shown in Fig. 2, thus the brushes 23, 24 and 25, 26 are disposed along lines displaced by 180/n degrees with respect to the axis of 21 and are short-circuited along these lines in pairs as shown. At starting those portions of 16 which are included between the brushes 23, 24 on one side and 25, 26 on the other, do duty as working conductors, whereas they do duty as field conductors in normal operation. Conversely those portions of 16 which are included between brushes 23, 25 on the one side and 24, 26 on the other, do duty as field turns at starting and as working turns in normal operation. If this machine is to be compensated then the compensating E. M. F. should be included between the brushes 23, 24 and 25, 26. After the motor has reached a sufficient speed and switch 4 has been thrown over to point 6 then the volts per turn in 19 can be varied at 20, the direction of the E. M. F. impressed on 19 can be reversed at 27 and the magnitude of the E. M. F. impressed on 16 and 21 can be varied at 13, thus varying the speed of the motor.

In Fig. 4 is shown one way of combining the teaser winding 19 with the neutralizing winding 21. This modification has been illustrated by way of example in connection with the arrangement shown in Fig. 1. In Fig. 4 the rotor only carries one winding instead of two as in Fig. 1 but this difference is of course quite immaterial. Winding 19 of Fig. 1 has been omitted and the leads from the transformer 41 have been connected to the terminals of 21. By this modification winding 19 is entirely dispensed with, the machine is simplified and its efficiency is improved without in the least impairing its pliability.

The regulating E. M. F. included in the motor field circuit can also be made use of at starting for exciting the motor field in which case the connections need not be altered at starting and winding 8 can be dispensed with. In all cases the commutation can be improved by suitably adjusting the relative values of rotor speed, motor field and teaser flux.

All these machines, can, of course, be used as generators and the invention is not restricted to motors with any given number of pole pairs. The stationary part can take the form of a stator or may have well defined polar projections. Any kind of stator winding may be used.

Having fully described my invention, what I claim as new and desire to secure by Letters Patent of the United States is:

1. In an alternating current motor, the combination with a stationary member provided with a neutralizing winding, of a revolving member provided with a commuted winding connected in series relation with the neutralizing winding along an axis coinciding with the axis of said neutralizing winding, exciting brushes on the revolving member, and means for producing an alternating flux along an axis approximately coinciding with that of the neutralizing winding.

2. In an alternating current motor, the combination with a stationary member provided with a neutralizing winding, of a revolving member provided with a commuted winding connected in series relation with the neutralizing winding, a teaser winding on the stationary member, and exciting brushes on the revolving member along an axis displaced from that of the neutralizing winding.

3. In an alternating current motor, the combination with a stationary member provided with a neutralizing winding and a teaser winding, of a revolving member carrying a conductively impressed working current along an axis coinciding with that of the neutralizing winding, and an exciting current along an axis displaced from that of the neutralizing winding.

4. In an alternating current motor, the combination with a stationary member provided with a neutralizing winding and a teaser winding, of a revolving member provided with a commuted winding connected in series relation with the neutralizing winding along an axis coinciding with the axis of said neutralizing winding, and an exciting circuit on the revolving member.

5. In an alternating current motor, the combination with a stationary member provided with a neutralizing winding and a teaser winding coaxially disposed therewith, of a rotor provided with a commuted winding, means connected in series relation with the neutralizing winding for conductively impressing a working E. M. F. on said commuted winding along an axis coinciding with the axis of said neutralizing winding, and means for providing an exciting circuit by closing the circuit of said commuted winding along an axis displaced from the axis of the neutralizing winding.

6. In an alternating current motor, the combination with a stationary member provided with a neutralizing winding and a teaser winding, of a rotor provided with a commuted winding connected in series relation with the neutralizing winding along an axis coinciding with the axis of said neutralizing winding, an exciting circuit provided by closing the circuit of said commuted winding along an axis displaced from the axis of the neutralizing winding, and means for varying the volts per turn of said teaser winding.

7. In an alternating current motor, the combination with a stationary member provided with a neutralizing winding and a teaser winding, of a rotor provided with a commuted winding, means connected in series relation with the neutralizing winding for conductively impressing a working E. M. F. on said commuted winding along an axis coinciding with the axis of said neutralizing winding, means for varying the magnitude of said E. M. F., and an exciting circuit on the revolving member.

8. In an alternating current motor, the combination with a stationary member provided with a neutralizing winding and a teaser winding coaxially disposed therewith, of a rotor provided with a commuted winding, means connected in series relation with the neutralizing winding for conductively impressing a working E. M. F. on said commuted winding along an axis coinciding with the axis of said neutralizing winding, an exciting circuit through said commuted winding along an axis displaced from the axis of the neutralizing winding, and means for impressing on said teaser winding an E. M. F. of approximately the same phase as that of the working E. M. F.

9. In an alternating current motor, the combination with a stationary member provided with a neutralizing winding, a teaser winding and a field winding displaced in space from the neutralizing winding, of a rotor provided with a commuted winding connected in series relation with the neutralizing winding along an axis coinciding with the axis of said neutralizing winding and an exciting circuit provided by connecting said field winding in series with said commuted winding along an axis displaced from that of the neutralizing winding.

10. In an alternating current motor, the combination with a stationary member provided with a neutralizing winding and a teaser winding, of a rotor provided with a commuted winding connected in series relation with the neutralizing winding along an axis coinciding with the axis of said neutralizing winding, a field winding disposed on the stationary member displaced in space from the neutralizing winding and connected in series relation with the commuted winding along an axis displaced from that of the neutralizing winding, and means for varying the magnitude and direction of the magnetization produced by said field winding.

11. In an alternating current motor, the combination with a stationary member provided with a neutralizing winding and a teaser winding coaxially disposed therewith, of a rotor provided with a commuted winding, means connected in series relation with the neutralizing winding for conductively impressing a working E. M. F. on said commuted winding along an axis coinciding with the axis of said neutralizing winding, an exciting circuit through said commuted winding along an axis displaced from the axis of the neutralizing winding, and means for introducing into said exciting circuit an E. M. F. of approximately the same phase as the working E. M. F. for compensating the motor.

12. In an alternating current motor, the combination with a stationary member provided with a neutralizing winding and a teaser winding coaxially disposed therewith, of a rotor provided with a commuted winding, means connected in series relation with the neutralizing winding for conductively impressing a working E. M. F. on said commuted winding along an axis coinciding with the axis of said neutralizing winding, an exciting circuit through said commuted winding along an axis displaced from the axis of the neutralizing winding and means for introducing into the exciting circuit an E. M. F. approximately in phase quadrature with the working E. M. F.

13. In an alternating current motor, the combination with a stationary member provided with a neutralizing winding and a teaser winding, of a rotor provided with a commuted winding, means connected in series relation with the neutralizing winding for conductively impressing a working E. M. F. on said commuted winding along an axis coinciding with the axis of said neutralizing winding, means for varying the magnitude of said E. M. F., an exciting circuit through said commuted winding along an axis displaced from the axis of the neutralizing winding, and means for varying the volts per turn of the said teazer winding.

14. In an alternating current motor, the combination with a stationary member provided with a neutralizing winding and a teaser winding, of a rotor provided with a commuted winding, means connected in series relation with the neutralizing winding for conductively impressing a working E. M. F. on said commuted winding along an axis coinciding with the axis of said neutralizing winding, means for varying the magnitude of said E. M. F., means for providing an exciting circuit by closing the circuit of said commuted winding along an axis displaced from the axis of the neutralizing winding, and means for varying the magnetization produced by the exciting circuit.

15. In an alternating current motor the combination with a stationary member provided with a neutralizing winding and a teaser winding, of a rotor provided with a commuted winding connected in series relation with the neutralizing winding along an axis coinciding with the axis of said neutralizing winding, means for providing an exciting circuit by closing the circuit of said commuted winding along an axis displaced from the axis of the neutralizing winding, and a normally inactive winding adapted to be used at starting.

16. In an alternating current motor, the combination with a stationary member provided with a neutralizing winding, a teaser winding and a field winding displaced in space from the neutralizing winding, of a revolving member provided with a commuted winding, means connected in series relation with the neutralizing winding for conductively impressing a working E. M. F. on said commuted winding along an axis coinciding with the axis of said neutralizing winding, means for varying the magnitude of said E. M. F., an exciting circuit provided by connecting said field winding in series with said commuted winding along an axis displaced from that of the neutralizing winding, means for varying the magnitude and direction of the magnetization produced by said field winding, means for introducing into the said exciting circuit an E. M. F. approximately in phase quadrature with the working E. M. F., connections with the source of supply for introducing into the exciting circuit an E. M. F. of approximately the same phase as the working E. M. F. for compensating the motor, and a starting winding disposed on the stator.

17. In an alternating current motor, the combination with a stationary member provided with a neutralizing winding, of a revolving member provided with a commuted winding connected in series relation with the neutralizing winding along an axis coinciding with the axis of said neutralizing winding, an exciting winding at least partly disposed on the revolving member, means for producing an alternating flux along an axis approximately coinciding with that of the neutralizing winding, and means for varying the magnitude of said alternating flux.

18. In an alternating current motor, the combination with a stationary member provided with a neutralizing winding, of a rotor provided with a commuted winding, means connected in series relation with the neutralizing winding for conductively impressing a working E. M. F. on said commuted winding along an axis coinciding with the axis of said neutralizing winding, means for varying the magnitude of said E. M. F., an exciting circuit on the revolving member, and means for producing an alternating flux along an axis approximately coinciding with that of the neutralizing winding.

19. In an alternating current motor, the combination with a stationary member provided with a neutralizing winding, and a field winding displaced in space from the neutralizing winding, of a rotor provided with a commuted winding connected in series relation with the neutralizing winding along an axis coinciding with the axis of said neutralizing winding, an exciting circuit provided by connecting said field winding in series with said commuted winding along an axis displaced from that of the neutralizing winding, and means for producing an alternating flux along an axis approximately coinciding with that of the neutralizing winding.

20. In an alternating current motor, the combination with a stationary member provided with a neutralizing winding, of a rotor provided with a commuted winding connected in series relation with the neutralizing winding along an axis coinciding with the axis of said neutralizing winding, a field winding disposed on the stationary member displaced in space from the neutralizing winding and connected in series relation with the commuted winding along an axis displaced from that of the neutralizing winding, means for varying the magnitude and direction of the magnetization produced by said field winding, and means for producing an alternating flux along an axis approximately coinciding with that of the neutralizing winding.

21. In an alternating current motor, the combination with a stationary member provided with a neutralizing winding, of a rotor provided with a commuted winding, means connected in series relation with the neutralizing winding for conductively impressing a working E. M. F. on said commuted winding along an axis coinciding with the axis of said neutralizing winding, an exciting circuit through said commuted winding along an axis displaced from the axis of the neutralizing winding, means for introducing into said exciting circuit an E. M. F. of approximately the same phase as the working E. M. F. for compensating the motor, and means for producing an alternating flux along an axis approximately coinciding with that of the neutralizing winding.

22. In an alternating current motor, the combination with a stationary member provided with a neutralizing winding, of a rotor provided with a commuted winding, means connected in series relation with the neutralizing winding for conductively impressing a working E. M. F. on said commuted winding along an axis coinciding with the axis of said neutralizing winding, an exciting circuit through said commuted winding along an axis displaced from the axis of the neutralizing winding, means for introducing into the exciting circuit an E. M. F. approximately in phase quadrature with the working E. M. F., and means for producing an alternating flux along an axis approximately coinciding with that of the neutralizing winding.

23. In an alternating current motor, the combination with a stationary member provided with a neutralizing winding, of a rotor provided with a commuted winding connected in series relation with the neutralizing winding along an axis coinciding with the axis of said neutralizing winding, means for providing an exciting circuit by closing the circuit of said commuted winding along an axis displaced from the axis of the neutralizing winding, a normally inactive winding adapted to be used at starting, and means for producing an alternating flux along an axis approximately coinciding with that of the neutralizing winding.

24. In an alternating current motor, the combination with a stationary member provided with a neutralizing winding, a field winding displaced in space from the neutralizing winding, of a revolving member provided with a commuted winding, means connected in series relation with the neutralizing winding for conductively impressing a working E. M. F. on said commuted winding along an axis coinciding with the axis of said neutralizing winding, means for varying the magnitude of said E. M. F., an exciting circuit provided by connecting said field winding in series with said commuted winding along an axis displaced from that of the neutralizing winding, means for varying the magnitude and direction of the magnetization produced by said field winding, means for introducing into the said exciting circuit an E. M. F. approximately in phase quadrature with the working E. M. F., connections with the source of supply for introducing into the exciting circuit an E. M. F. of approximately the same phase as the working E. M. F. for compensating the motor, a starting winding disposed on the stator, and means for producing an alternating flux along an axis approximately coinciding with that of the neutralizing winding.

In witness whereof I have hereunto set my hand and seal in the presence of the two subscribing witnesses.

VALÈRE ALFRED FYNN. [L.S.]

Witnesses:
W. A. ALEXANDER,
E. E. HUFFMAN.